(12) United States Patent
Liao et al.

(10) Patent No.: US 12,206,121 B2
(45) Date of Patent: Jan. 21, 2025

(54) ALUMINUM COVER PLATE OF BATTERY

(71) Applicant: LINKDATA NEW ENERGY CO., LTD., Wuxi (CN)

(72) Inventors: Xiaxia Liao, Wuxi (CN); Xiaoyun Zhang, Wuxi (CN); Sitao Yang, Wuxi (CN); Jun Wu, Wuxi (CN)

(73) Assignee: LINKDATA NEW ENERGY CO., LTD., Wuxi (CN)

( * ) Notice: Subject to any disclaimer, the term of this patent is extended or adjusted under 35 U.S.C. 154(b) by 511 days.

(21) Appl. No.: 17/546,767

(22) Filed: Dec. 9, 2021

(65) Prior Publication Data

US 2022/0102793 A1    Mar. 31, 2022

Related U.S. Application Data

(63) Continuation of application No. PCT/CN2020/130546, filed on Nov. 20, 2020.

(30) Foreign Application Priority Data

May 18, 2020 (CN) .......................... 202020825059.5

(51) Int. Cl.
*H01M 50/152* (2021.01)
*H01M 10/0525* (2010.01)
*H01M 50/159* (2021.01)
*H01M 50/164* (2021.01)
*H01M 50/179* (2021.01)
*H01M 50/184* (2021.01)
(Continued)

(52) U.S. Cl.
CPC ..... *H01M 50/152* (2021.01); *H01M 10/0525* (2013.01); *H01M 50/159* (2021.01); *H01M 50/164* (2021.01); *H01M 50/179* (2021.01); *H01M 50/184* (2021.01); *H01M 50/188* (2021.01); *H01M 50/566* (2021.01)

(58) Field of Classification Search
CPC .......... H01M 50/152; H01M 10/0525; H01M 50/159; H01M 50/164; H01M 50/179; H01M 50/184; H01M 50/188; H01M 50/566; H01M 50/186; H01M 50/193; Y02E 60/10
See application file for complete search history.

(56) References Cited

FOREIGN PATENT DOCUMENTS

| CN | 103314467 | * | 9/2013 | .......... H01M 10/425 |
| CN | 204204929 U | | 3/2015 | |
| CN | 106374059 A | | 2/2017 | |

(Continued)

OTHER PUBLICATIONS

International Search Report dated Feb. 20, 2021 for International Application No. PCT/CN2020/130546.

*Primary Examiner* — Helen Oi K Conley

(57) ABSTRACT

The present application discloses an improved aluminum cover plate of a battery, including a cover plate, a metal sheet and an electrode column. The electrode column penetrates and is arranged in rivet holes of the cover plate and the metal sheet, and is riveted with the metal sheet. A first sealing ring is arranged between a cap portion and a nail portion of the electrode column and the cover plate. A second sealing ring is arranged on an outer periphery of the nail portion of the electrode column, and the second sealing ring is clamped and arranged between the cover plate and the metal sheet. The first sealing ring and the second sealing ring are arranged separately.

12 Claims, 2 Drawing Sheets

(51) Int. Cl.
*H01M 50/188* (2021.01)
*H01M 50/566* (2021.01)

(56) References Cited

FOREIGN PATENT DOCUMENTS

| | | | |
|---|---|---|---|
| CN | 109037505 | A | 12/2018 |
| CN | 109774056 | A | 5/2019 |
| CN | 208835105 | U | 5/2019 |
| CN | 209447855 | U | 9/2019 |
| CN | 210073934 | U | 2/2020 |
| CN | 211879413 | U | 11/2020 |
| JP | 2019061746 | A | 4/2019 |

\* cited by examiner

ALUMINUM COVER PLATE OF BATTERY

CROSS REFERENCE TO RELATED APPLICATION

The present application is a continuation of International Application No. PCT/CN2020/130546, filed on Nov. 20, 2020, which claims priority to Chinese Patent Application No. 202020825059.5, filed on May 18, 2020, both of which are hereby incorporated by reference in their entireties.

TECHNICAL FIELD

The present application relates to a technical filed of lithium ion battery, and specifically relates to an improved aluminum cover plate of a battery.

BACKGROUND

A cylindrical lithium ion battery has the high energy density and the good safety performance, and is widely used in the field of new energy vehicles and the like. A lithium battery aluminum cover plate in a prior art, as described in CN204204929U, includes a cover plate, a sealing sleeve and a rivet-shaped electrode column; the cover plate is an aluminum plate or an aluminum alloy plate; the cover plate is provided with rivet holes and injection holes which are spaced apart from one another; rivets penetrate and insert into the rivet holes; the sealing sleeve is fixedly sleeved on the rivet and penetrates through the rivet hole; an inner wall of the sealing sleeve elastically holds against the rivet, and an outer wall of the sealing sleeve elastically holds against a side wall of the rivet hole. The disadvantage of the solution is that the sealing sleeve is made of PFA material and integrated with the cover plate by injection molding. The PFA material will shrink to a certain extent after used for a long term, so the probability of leakage through a sealing ring is higher.

A power battery cover plate with a single rivet structure has been disclosed in CN210073934U, in which the sealing of a rivet and a cover plate is realized by a rubber gasket and a sealing ring, and a surface of the sealing ring is pressed against the rivet, the cover plate and a stop frame. The disadvantage of the solution is that a pressure plate under the stop frame is riveted with a nail part of the rivet, that is, the pressure plate applies a pressing force to the sealing ring through the stop frame, and a contact area between the stop frame and the sealing ring is small, so that the stability of the sealing ring is not good.

SUMMARY

The object of the present application is to overcome the defects in the prior art and provide an improved aluminum cover plate of a battery, which can form a double sealing structure of a first sealing ring and a second sealing ring.

In order to achieve the above technical effects, the technical solution of the present application is: an improved aluminum cover plate of a battery, including a cover plate, a metal sheet and an electrode column. The electrode column penetrates and is arranged in rivet holes of the cover plate and the metal sheet, and is riveted with the metal sheet. A first sealing ring is arranged between a cap portion and a nail portion of the electrode column and the cover plate; in which a second sealing ring is arranged at an outer periphery of the nail portion of the electrode column, and the second sealing ring is clamped and arranged between the cover plate and the metal sheet; the first sealing ring and the second sealing ring are arranged separately.

In some embodiments, the improved aluminum cover plate of the battery further includes a stop frame. A through hole is formed in an insulating based plate of the stop frame, the insulating based plate is clamped and arranged between the cover plate and the metal sheet, and the second sealing ring is arranged in the through hole.

In some embodiments, the rivet hole of the metal sheet is a stepped hole, and an end of the second sealing ring is arranged in the stepped hole.

In some embodiments, a material of the first sealing ring is PFA, and a material of the second sealing ring is fluorine rubber.

In some embodiments, the first sealing ring and the second sealing ring are arranged to be spaced apart from each other.

In some embodiments, the metal sheet is made of a copper sheet or a nickel sheet, and a rivet end of the electrode column is also connected to the metal sheet by welding.

In some embodiments, the stop frame further includes a stop protrusion, the stop protrusion is fixedly connected to the insulating based plate, the stop protrusion protrudes away from the cover plate, and a protrusion height of the stop protrusion is greater than a thickness of the metal sheet.

In some embodiments, the second sealing ring is in a sealing fit with a wall of the through hole.

The advantages and the beneficial effects of the present application are that:

the improved aluminum cover plate of the battery adopts the first sealing ring and the second sealing ring that are arranged separately. A double sealing structure is formed by the separate sealing of the first sealing ring and the second sealing ring. Since the second sealing ring is clamped and arranged between the cover plate and the metal sheet, sealing materials other than PFA can be selected to further optimize the sealing effect of the electrode column.

Figure 1:
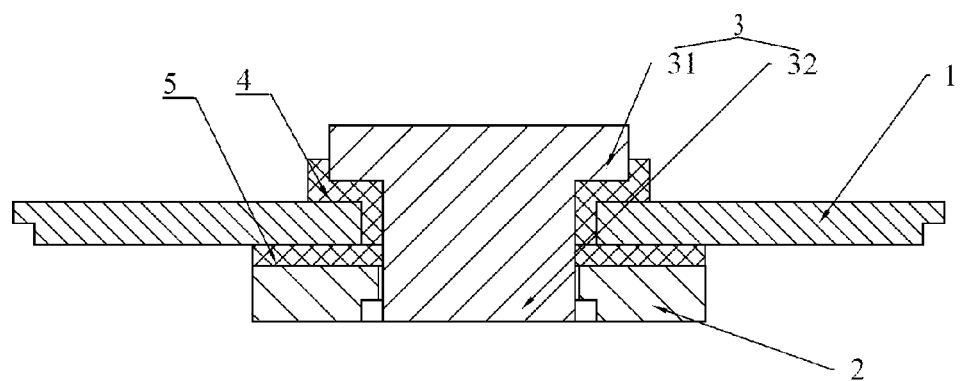
FIG. 1 shows a schematic view of an improved aluminum cover plate of a battery in Example 1.

1—cover plate; 2—metal sheet; 3—electrode column; 31—cap portion; 32—nail portion; 4—first sealing ring; 5—second sealing ring; 6—stop frame; 61—insulating based plate; 62—.stop protrusion.

DETAILED DESCRIPTION

The specific embodiments of the present application will be further described below in conjunction with the drawings and the examples. The following examples are only used to illustrate the technical solutions of the present application more clearly, and cannot be used to limit the protection scope of the present application.

A first sealing ring is based on a sealing ring in a prior art, and a second sealing ring is clamped and arranged between a cover plate and a metal sheet. Other materials that meet the sealing and using conditions different from the first sealing ring can be selected, such as a fluorine rubber.

Compared with PFA, fluorine rubber has better elasticity, and the force of riveting and pressing can directly act on the second sealing ring and be transmitted to the first sealing ring.

The insulating base plate of the stop frame made of the insulating material is arranged between the cover plate and the metal sheet. The insulating based plate replaces the PFA with a larger area on the cover plate facing to the metal sheet in the prior art. At the same time, the stop frame also has the function of pressing against a roll core to prevent the roll core from moving in a battery housing. The number of portions of the aluminum cover plate of a cylindrical battery is low, so that the cylindrical battery has a simple structure but a reliable sealing.

A thickness of the second sealing ring clamped and arranged between the cover plate and the metal sheet is slightly larger than a thickness of the insulating based plate. During riveting, the cover plate and the metal sheet are pressed tightly, the second sealing ring is deformed, and the cover plate and the metal sheet tightly clamp the insulating based plate. There may be a gap between an outer wall of the second sealing ring and a wall of a through hole, or the outer wall of the second sealing ring may elastically hold against the wall of the through hole. In some embodiments, the outer wall of the second sealing ring may elastically hold against the wall of the through hole. A shape of the base plate of the cylindrical battery is consistent with a shape of the stop frame, and may be circular, elliptical or polygonal. The second sealing ring is conducive to locating the stop frame. After the electrode column and the metal sheet are riveted, the second sealing elastically holds against the nail portion of the electrode column, the metal sheet, the cover plate and the stop frame surrounding the second sealing ring.

The electrode column and the metal sheet are connected by riveting and welding, and a rivet gap can be further sealed by welding, so that it can further optimize the sealing effect.

A shape of a stop protrusion is set according to a shape of the roll core matching with the stop protrusion, and they are arranged at an outer periphery of the metal sheet. As described in a known solution, a tab notch for accommodating a bent tab is arranged between the stop protrusions in a circumferential direction of the insulating based plate, and a corresponding liquid-injection hole is also formed on the cover plate and the stop frame.

Example 1

As shown in FIG. 1, in Example 1, an improved aluminum cover plate of a battery is the aluminum cover plate of the cylindrical battery, which includes the cover plate 1, the metal sheet 2 and the electrode column 3. The cover plate 1 is circular, and the electrode column 3 penetrates and is arranged in rivet holes of the cover plate 1 and the metal sheet 2 and is riveted with the metal sheet 2. The first sealing ring 4 is arranged between the cap portion 31 and nail portion 32 of the electrode column 3 and the cover plate 1. One end of the first sealing ring 4 is arranged at the outer periphery of the cap portion of the electrode column 3, and the other end is arranged at the outer periphery of the nail portion of the electrode column 3 and is located in the rivet hole of the cover plate 1. The second sealing ring 5 is arranged at the outer periphery of the nail portion 32 of the electrode column 3, which is clamped and arranged between the cover plate 1 and the metal sheet 2; the first sealing ring 4 and the second sealing ring 5 are arranged separately.

In Example 1, a cross section of the second sealing ring 5 is rectangular, and an end surface of the first sealing ring 4 and an end surface of the second sealing ring 5 at the outer periphery of the nail portion 32 of the electrode column 3 are close. A surface of the metal sheet 2 in contact with the second sealing ring 5 is flat.

The materials of the first sealing ring 4 and the second sealing ring 5 are both PFA. The second sealing ring 5 can be integrally injection molded with the metal sheet 2, or can be separately molded and then assembled.

The rivet hole is a center hole; FIG. 1 shows a cross-sectional view of the aluminum cover plate of the battery on a plane where a center line of the rivet hole is located.

Under the force of the riveting pressure, the end surfaces of the first sealing ring 4 and the second sealing ring 5 which are close with each other are also deformed and pressed against each other.

Example 2

Figure 2:
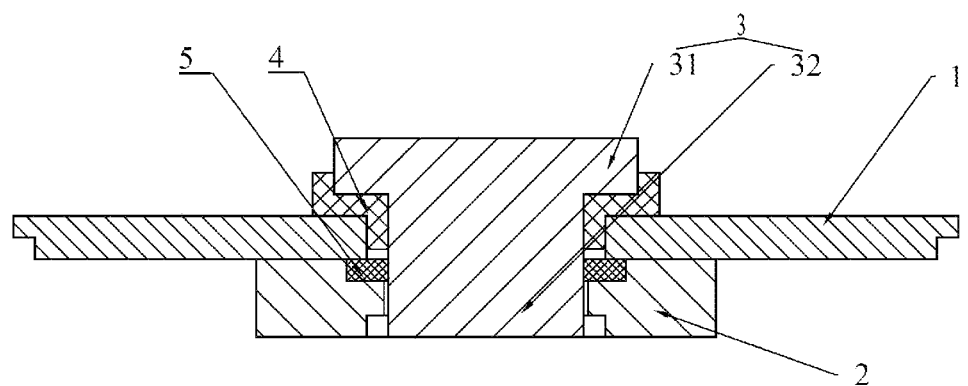
FIG. 2 shows a schematic view of an improved aluminum cover plate of a battery in Example 2.

As shown in FIG. 2, Example 2 is based on Example 1. The difference is that, in Example 2, a material of the second sealing ring 5 is fluorine rubber, the rivet hole of the metal sheet 2 is a stepped hole, and an end of the second sealing ring 5 is arranged in the stepped hole. The end surfaces of the first sealing ring 4 and the second sealing ring 5 are arranged spaced apart from each other at the outer periphery of the nail portion 32 of the electrode column 3.

Example 3

Figure 3:
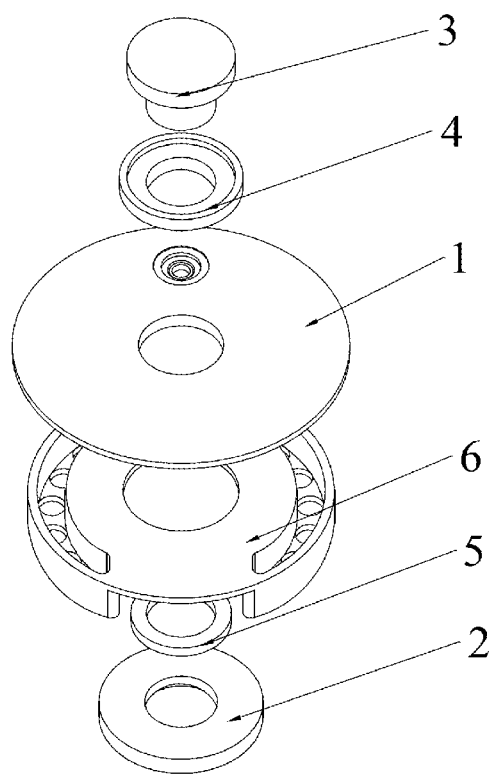
FIG. 3 shows an exploded view of an improved aluminum cover plate of a battery in Example 3.
Figure 4:
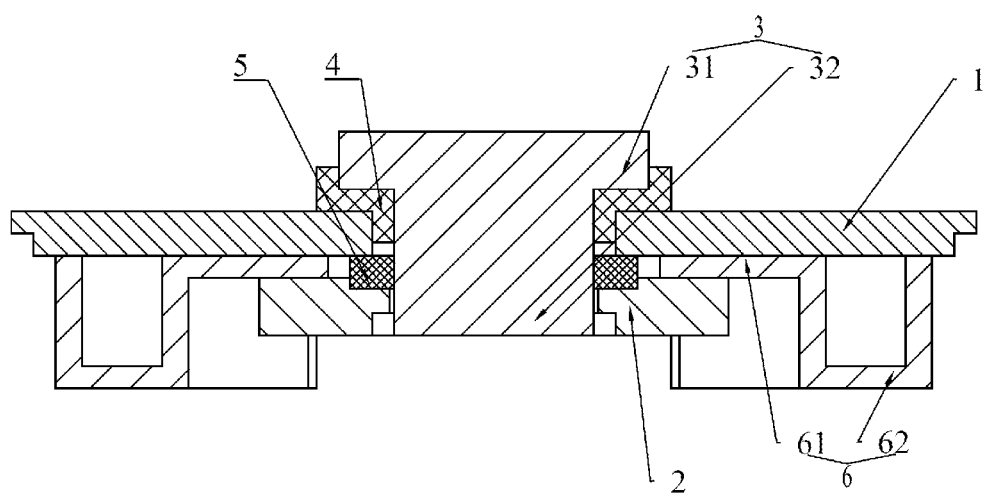
FIG. 4 shows a structural schematic sectional view of an improved aluminum cover plate of a battery in Example 3.

As shown in FIGS. 3-4, Example 3 is based on Example 2. The difference is that, in Example 3, the aluminum cover plate of the battery further includes a stop frame 6. A through hole is formed in an insulating based plate of the stop frame 6, and the insulating based plate 61 is clamped and arranged between the cover plate 1 and the metal sheet 2. The stop frame 6 further includes a stop protrusion 62, the stop protrusion 62 is fixedly connected to the insulating based plate 61, the stop protrusion 62 protrudes away from the cover plate 1, the stop protrusion 62 is arranged to be spaced apart from the metal sheet 2, and a protrusion height of the stop protrusion 62 is greater than a thickness of the metal sheet 2. The second sealing ring 5 is arranged in the through hole, and the second sealing ring 5 is in a sealing fit with a wall of the through hole.

The metal sheet 2 is made of a copper sheet or a nickel sheet, and a rivet end of the electrode column 3 is also connected to the metal sheet 2 by welding.

The first sealing ring 4 and the second sealing ring 5 in Examples 1-3 can achieve a double sealing effect.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. An aluminum cover plate of a battery, comprising a cover plate, a metal sheet and an electrode column, wherein the electrode column penetrates and is arranged in rivet holes of the cover plate and the metal sheet, and is riveted with the metal sheet; a first sealing ring is arranged between a cap portion and a nail portion of the electrode column and the cover plate;

wherein a second sealing ring is arranged at an outer periphery of the nail portion of the electrode column, and the second sealing ring is clamped and arranged between the cover plate and the metal sheet; the first sealing ring and the second sealing ring are arranged separately; and the first sealing ring and the second sealing ring are arranged to be spaced apart from each other.

2. The aluminum cover plate of the battery according to claim 1, further comprising a stop frame, wherein a through hole is formed in an insulating based plate of the stop frame, the insulating based plate is clamped and arranged between the cover plate and the metal sheet, and the second sealing ring is arranged in the through hole.

3. The aluminum cover plate of the battery according to claim 1, wherein the rivet hole of the metal sheet is a stepped hole, and an end of the second sealing ring is arranged in the stepped hole.

4. The aluminum cover plate of the battery according to claim 1, wherein a material of the first sealing ring is perfluoroalkoxy (PFA), and a material of the second sealing ring is fluorine rubber.

5. The aluminum cover plate of the battery according to claim 1, wherein the metal sheet is made of a copper sheet or a nickel sheet, and a rivet end of the electrode column is connected to the metal sheet by welding.

6. The aluminum cover plate of the battery according to claim 2, wherein the stop frame further comprises a stop protrusion, the stop protrusion is fixedly connected to the insulating based plate, the stop protrusion protrudes away from the cover plate, the stop protrusion and the metal sheet are arranged to be spaced apart from each other, and a protrusion height of the stop protrusion is greater than a thickness of the metal sheet.

7. The aluminum cover plate of the battery according to claim 2, wherein the second sealing ring is in a sealing fit with a wall of the through hole.

8. An aluminum cover plate of a battery, comprising a cover plate, a metal sheet and an electrode column, wherein the electrode column penetrates and is arranged in rivet holes of the cover plate and the metal sheet, and is riveted with the metal sheet; a first sealing ring is arranged between a cap portion and a nail portion of the electrode column and the cover plate;

wherein a second sealing ring is arranged at an outer periphery of the nail portion of the electrode column, and the second sealing ring is clamped and arranged between the cover plate and the metal sheet; the first sealing ring and the second sealing ring are arranged separately;

the aluminum cover plate further comprises a stop frame, a through hole is formed in an insulating based plate of the stop frame, the insulating based plate is clamped and arranged between the cover plate and the metal sheet, and the second sealing ring is arranged in the through hole; and the stop frame further comprises a stop protrusion, the stop protrusion is fixedly connected to the insulating based plate, the stop protrusion protrudes away from the cover plate, the stop protrusion and the metal sheet are arranged to be spaced apart from each other, and a protrusion height of the stop protrusion is greater than a thickness of the metal sheet.

9. The aluminum cover plate of the battery according to claim 8, wherein the rivet hole of the metal sheet is a stepped hole, and an end of the second sealing ring is arranged in the stepped hole.

10. The aluminum cover plate of the battery according to claim 8, wherein a material of the first sealing ring is polyfluoroalkoxy (PFA), and a material of the second sealing ring is fluorine rubber.

11. The aluminum cover plate of the battery according to claim 8, wherein the metal sheet is made of a copper sheet or a nickel sheet, and a rivet end of the electrode column is connected to the metal sheet by welding.

12. The aluminum cover plate of the battery according to claim 8, wherein the second sealing ring is in a sealing fit with a wall of the through hole.

* * * * *